United States Patent [19]
Foster et al.
[11] 4,405,830
[45] Sep. 20, 1983

[54] ELIMINATION OF DISPLAY BLANKS RESULTING FROM THE USE OF CHARACTER ATTRIBUTE CODES IN A VIDEOTEX TYPE SYSTEM

[75] Inventors: Robert A. L. Foster, Woodbridge; Geoffrey H. L. Childs, Felixstowe, both of England

[73] Assignee: Post Office, London, England

[21] Appl. No.: 279,514

[22] Filed: Jul. 1, 1981

[30] Foreign Application Priority Data

Jul. 3, 1980 [GB] United Kingdom ................. 8021817
Oct. 23, 1980 [GB] United Kingdom ................. 8034195

[51] Int. Cl.³ ............................................. H04L 13/16
[52] U.S. Cl. ...................................... 178/30; 178/113; 340/721; 340/750; 340/801; 340/709; 340/703
[58] Field of Search .................. 178/30, 113; 340/721, 340/724, 750, 748, 744, 801, 800, 799, 798, 709, 703, 725, 717

[56] References Cited

U.S. PATENT DOCUMENTS 4,297,693 10/1981 Parsons .......................... 340/721 X

*Primary Examiner*—Stafford D. Schreyer
*Attorney, Agent, or Firm*—Cushman, Darby & Cushman

[57] ABSTRACT

A data transmission of the videotex type in which coded information can be transmitted from a central information store to a plurality of terminals. The coded information includes groups of bits representing characters and groups of bits representing control codes. In the transmission technique used in the system a character attribute can be represented by a display control code which is transmitted in association with a cursor backspace code. By using this technique characters of different attributes can be displayed without a space being required between the characters on the display.

9 Claims, 9 Drawing Figures

| Bits $b_7$ $b_6$ $b_5$ $b_4$ $b_3$ $b_2$ $b_1$ | Row \ Col | $b_7$ 0 $b_6$ 0 $b_5$ 0 — Col 0 |
|---|---|---|
| 0 0 0 0 | 0 | NUL |
| 0 0 0 1 | 1 | |
| 0 0 1 0 | 2 | |
| 0 0 1 1 | 3 | |
| 0 1 0 0 | 4 | |
| 0 1 0 1 | 5 | ENQ |
| 0 1 1 0 | 6 | |
| 0 1 1 1 | 7 | |
| 1 0 0 0 | 8 | Active Position Backward (APB) |
| 1 0 0 1 | 9 | Active Position Forward (APF) |
| 1 0 1 0 | 10 | Active Position Down (APD) |
| 1 0 1 1 | 11 | Active Position Up (APU) |
| 1 1 0 0 | 12 | Clear Screen (CS) |
| 1 1 0 1 | 13 | Active Position Return (APR) |
| 1 1 1 0 | 14 | |
| 1 1 1 1 | 15 | |

FIG. 4A
(PRIOR ART)

<table>
<tr><td>0<br>0<br>1</td><td colspan="2">0<br>1<br>0</td><td colspan="3">0<br>1<br>1</td></tr>
<tr><td>1</td><td>2</td><td>2a</td><td>3</td><td>3a</td><td>3b</td></tr>
<tr><td></td><td>Sp</td><td></td><td>0</td><td></td><td></td></tr>
<tr><td>Cursor on</td><td>|</td><td></td><td>1</td><td></td><td>Set verify mode (1)</td></tr>
<tr><td></td><td>"</td><td></td><td>2</td><td></td><td>Set verify mode (2)</td></tr>
<tr><td></td><td>£</td><td></td><td>3</td><td></td><td>Skip block</td></tr>
<tr><td>Cursor off</td><td>$</td><td></td><td>4</td><td></td><td>Set programme mode</td></tr>
<tr><td></td><td>%</td><td></td><td>5</td><td></td><td></td></tr>
<tr><td></td><td>&</td><td></td><td>6</td><td></td><td></td></tr>
<tr><td></td><td>'</td><td></td><td>7</td><td></td><td></td></tr>
<tr><td></td><td>(</td><td></td><td>8</td><td></td><td></td></tr>
<tr><td></td><td>)</td><td></td><td>9</td><td></td><td></td></tr>
<tr><td></td><td>*</td><td></td><td>:</td><td></td><td></td></tr>
<tr><td>ESC</td><td>+</td><td></td><td>;</td><td></td><td></td></tr>
<tr><td></td><td>,</td><td></td><td><</td><td></td><td></td></tr>
<tr><td></td><td>–</td><td></td><td>=</td><td></td><td></td></tr>
<tr><td>Active Position Home (APH)</td><td>.</td><td></td><td>></td><td></td><td></td></tr>
<tr><td></td><td>/</td><td></td><td>?</td><td></td><td></td></tr>
</table>

FIG. 4B
(PRIOR ART)

| 1 0 0 | | 1 0 1 | |
|---|---|---|---|
| 4 | 4b | 5 | 5b |
| @ | | P | |
| A | Alphanumeric Red | Q | Mosaic Red |
| B | Alphanumeric Green | R | Mosaic Green |
| C | Alphanumeric Yellow | S | Mosaic Yellow |
| D | Alphanumeric Blue | T | Mosaic Blue |
| E | Alphanumeric Magenta | U | Mosaic Magenta |
| F | Alphanumeric Cyan | V | Mosaic Cyan |
| G | Alphanumeric White | W | Mosaic White |
| H | Flash | X | Conceal Display |
| I | Steady | Y | Contiguous Mosaics |
| J | | Z | Separated Mosaics |
| K | | — | |
| L | Normal Height | ½ | Black Background |
| M | Double Height | — | New Background |
| N | | ǀ | Hold Mosaics |
| O | | # | Release Mosaics |

FIG. 4C
(PRIOR ART)

ELIMINATION OF DISPLAY BLANKS RESULTING FROM THE USE OF CHARACTER ATTRIBUTE CODES IN A VIDEOTEX TYPE SYSTEM

This invention relates to data transmission systems in which information is transferred from a central store for display on display apparatus at one or more locations. The invention has particular application to systems commonly known as Videotex systems.

In the U.K. viewdata system a data display apparatus can be linked to a computer, in which is stored information, by means of telephone lines. The data display apparatus, e.g. a cathode ray tube, has a memory in which is stored coded information representative of characters for display on the data display apparatus, and instructions. The information is stored in the read only memory in a code based on the ISO-7 code which is an internationally accepted code. This code consists of 128 characters which generaly includes 94 or 96 displayable characters plus 32 control characters. The display characters include alphanumeric characters and graphic blocks.

The data display apparatus also includes a page formattor in which coded information representing a page to be displayed on the display can be stored. The coded information is stored in the page formattor in response to coded instructions transmitted down the telephone line from the computer to the read only memory. A page of information is built up in the form of 24 lines of 40 characters giving a maximum of 960 characters per page. Each character space on the display is a matrix of dots which is six or seven dots wide by ten dots high. A character is built up by illuminating certain specific dots of the matrix in order to form the required character. Illumination of the dots is controlled by a character generator in a conventional manner.

The code is a 7 bit code which is used to create the 128 separate codes. These are considered as 8 columns each with 16 codes. The codes of columns 0 and 1 represent control functions and are known as the C0 set. The codes of columns 2 to 7 represent characters for display such as alphanumerics or graphics. The C0 set includes control characters which can be used to extend the range of seven bit codes to provide additional control and character sets. One such control set is known as the C1 set which contains display control codes. These codes are used to control the attributes (e.g. colour and mode such as height or flashing) of the characters displayed. The C1 set is produced by what is known as the ESC (Fe) sequence as defined in IS0646 and 2022 and is achieved by transmitting the code representative of ESC in the C0 set followed by the appropriate code from column 4 or 5 for the attribute which is required.

The U.K. viewdata system uses what is known as a string orientated attribute display system. In this system attributes for each character depend upon previous attribute settings and there are limitations on how these settings are made. In particular each attribute setting which corresponds to a control character from the C1 set requires a space on the screen. Thus at least one space is required between characrter rectangles with different display colours in the same row. Once an attribute has been set it applies to all subsequent characters on that row unless changed by a further attribute control character. The advantages of the system are that line transmission and memory storage in the central computer and in the display terminals are maintained at an absolute minimum resulting in relatively simple computer systems based on fixed disc memory segments.

An alternative approach is known as a character orientated attribute display system and is used in many European countries other than in the U.K. In this system character attributes are set within each character position independently of screen position, previous characters etc. This means that within the display terminal memory additional bits are associated with each character in order to define the attribute and terminals are more costly than in the string orientated attribute system. However characters of different colours can be displayed without a space between them.

Despite the advantages of string orientated system the general requirement seems to be for a character orientated attribute display system. That is there is a requirement that attributes of characters can be changed without the need for a space between characters. This can be achieved by a modification to the display memory of a conventional viewdata terminal. The present invention proposes a transmission technique which can operate with the existing U.K. viewdata transmission codes and is entirely compatible with conventional viewdata display terminal and with modified terminals having the character orientated attribute display feature.

According to one aspect of the present invention there is provided a videotex type data transmission system in which coded information representing characters and character attributes is transmitted from a central information store to a plurality of terminals characterised in that the system is so arranged that a character attribute can be represented by a display control code which is transmitted in association with a cursor backspace code.

According to another aspect of the present invention there is provided a method of transmitting coded information representing character and character attributes between a central information store and a terminal in a videotex type data transmission system characterised in that character attributes can be represented by a display control code transmitted in association with a cursor backspace code.

The cursor backspace code can either follow the control code or precede the control code. A plurality of control codes can be associated with a particular character location, a cursor backspace code being transmitted in association with each control code.

By transmitting the cursor backspace or APB (active position backwards) code in this way it is possible on the modified viewdata display units to display two characters with different attributes (e.g. colour) without a space between them. Any number of character attributes may be set on a character, each attribute control code having an associated APB code. The line transmission can be taken from the currently defined U.K. viewdata transmission code and no change whatsoever is required in the standards.

An advantage of the transmission technique is that it is compatible with existing viewdata terminals which do not have the character attribute orientated feature. These terminals, in response to the APB code, overwrite the attribute code so that it is ignored and the subsequent character is displayed in the correct location.

The system is capable of enhancement to allow the introduction of new facilities such as off-screen attributes, black characteristics, inversion, transparent background and double width and double size characters.

The invention will be described now by way of example only with particular reference to the accompanying drawings. In the drawings:

FIGS. 4A, 4B, 4C and 4D are diagrams which show the U.K. viewdata transmission codes;

Figure 1:
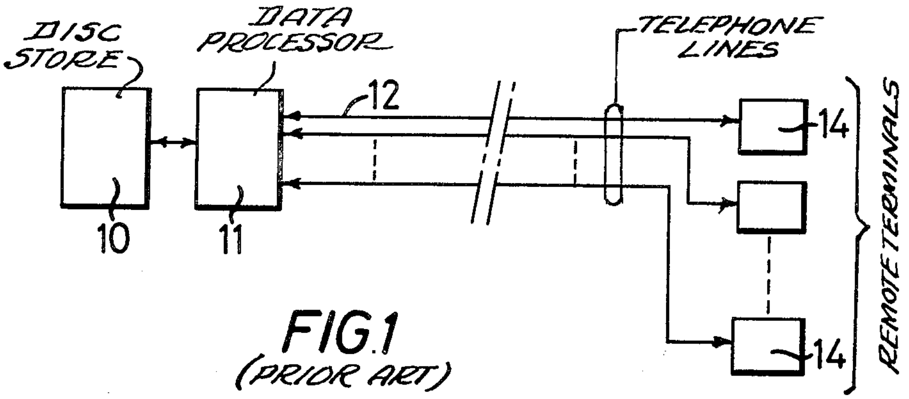
FIG.1 (PRIOR ART)
FIG. 1 is a block schematic diagram illustrating the U.K. viewdata system.

The U.K. viewdata transmission system comprises a computer having a main disc store 10 in which is stored data for transmission to the terminals of the system. The disc 10 is connected by a processor 11 to telephone lines 12 which link the computer to the terminals 14. The operation of this type of system will be known to those skilled in the art.

Figure 2:
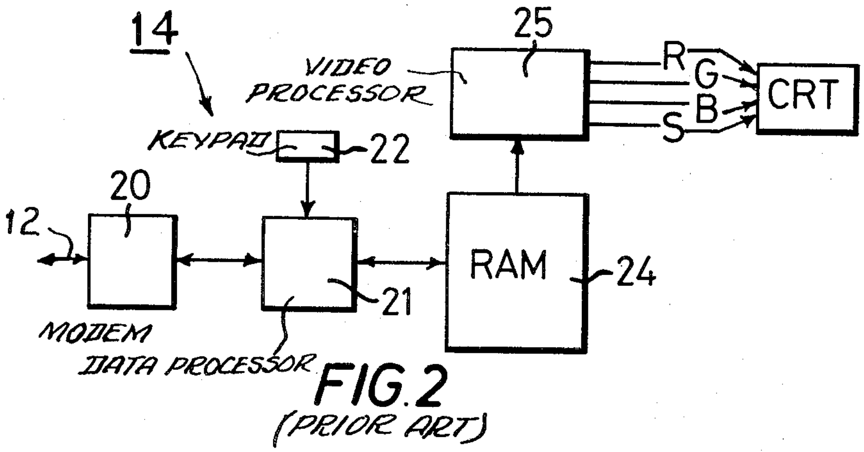
FIG.2 (PRIOR ART)
FIG. 2 is a block schematic diagram illustrating a display terminal used in the system of FIG. 1.

Each terminal 14 includes a display apparatus which is shown schematically in FIG. 2. The display apparatus includes a modem 20 which receives coded information from the telephone line 12 and converts it to a form acceptable to the circuitry of the display apparatus. The output from the modem 20 is fed to a processor 21 to which can be connected a user's keypad 22. The processor 21 is connected to a random access memory (RAM) 24 which can be accessed by a videoprocessor 25. The videoprocessor 25 has outputs R(red), G(green), B(blue) and S(sync) which are connected to a cathode ray tube in a conventional manner. The operation of the display apparatus illustrated in FIG. 2 will be well known to those skilled in the art and will not be described in detail. Briefly a page of information is built up in the memory 24 which can store 960 bytes under the control of the videoprocessor 25 on the basis of the coded information transmitted over the telephone line 12. This page of information is displayed on the cathode ray tube of the display apparatus. The viewdata transmission code are held in a read only memory (ROM) within the processor 25. In the display apparatus shown in FIG. 2 a control code representing a character attribute occupies one byte of the memory 24 and this results in a corresponding space on the display screen.

Figure 3:
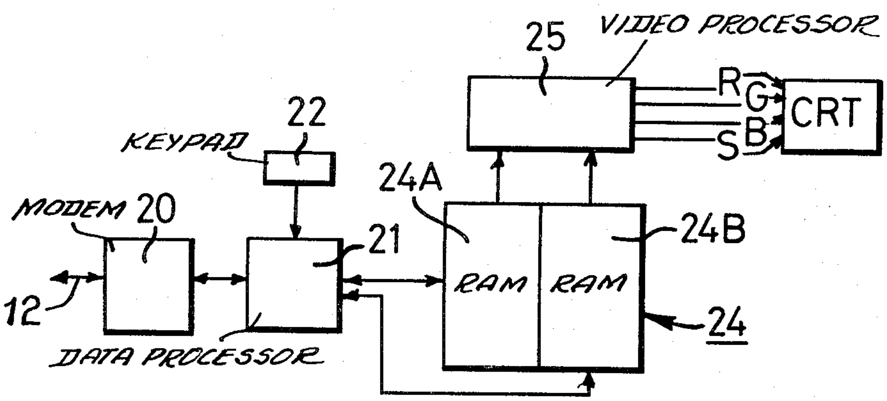
FIG.3 (PRIOR ART)
FIG. 3 is a block schematic diagram illustrating a modified form of display terminal.
Figure 4D:
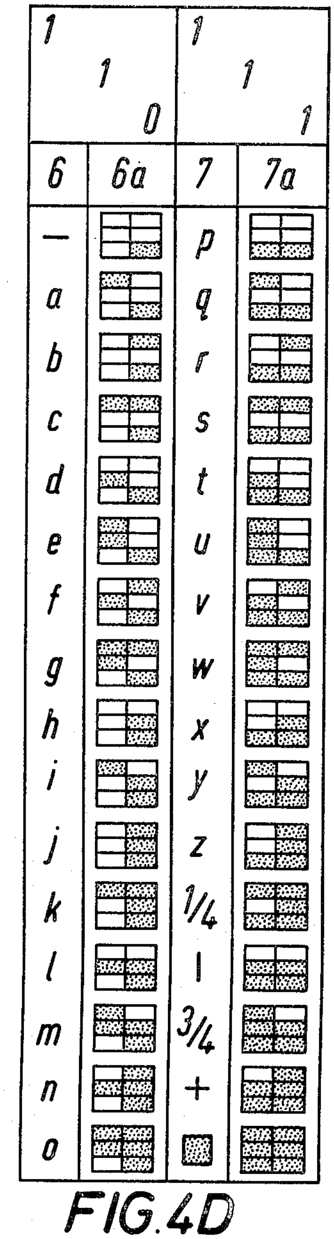
FIG. 4D (PRIOR ART)

A modified form of display apparatus is shown in FIG. 3. This display apparatus has a modem 20 and a processor 21 corresponding to those of FIG. 2. In the display apparatus of FIG. 3 the memory 24 has two sections 24A and 24B. The section 24A can store 960 bytes representing characters alone. Character attributes are stored in the section 24B. The processor 21 is linked to both sections so that the appropriate codes are fed to the appropriate location. Similarly the videoprocessor 25 can access both sections 24A, 24B of the memory. The videoprocessor 25 can take the form of a Philips AROM which is a commercially available device. By arranging the memory 24 as shown in FIG. 3 it will be apparent to those skilled in the art that the display apparatus can display characters with different attributes without a space being required between the characters. This is because character attribute codes do not occupy any of the character spaces in the memory 24A.

The codes for the U.K. viewdata system are shown in FIGS. 4A–4D. The codes are 7 bit codes represented as bits b1 to b7. The codes in columns 2 to 7 represent displayable characters and the codes in columns 0 and 1 are control codes.

The control codes are not stored or displayed and are used mainly to control the storage of codes of columns 2 to 7. Columns 2*a*, 3*a* 6*a* and 7*a* represent a series of graphics symbols. These are displayed on the screen when the graphics mode is invoked following receipt of a graphics control character.

Columns 4*b* and 5*b* contain display control codes including the alpha and graphics control codes. These codes are stored in memory and act during display time to change display modes i.e. character attributes. They are transmitted by means of an escape sequence. This consists of ESC (column 1, row 11) followed by the appropriate code from column 4*b* or 5*b* which represents the appropriate attribute. In presently used viewdata terminals when the attribute of a character is changed an attribute control code is transmitted and this requires a space on the screen since as described above it requires a character space in the memory 24 of FIG. 2.

Columns 0 and 1 contain a number of cursor control codes. These control the position and display of the cursor. The cursor is the character position in which the next received character is to be displayed.

In the present transmission technique, when it is required to display characters with different attributes without a space between the characters the system is arranged so that each attribute control code ESC, (F), can be followed by the code for the cursor back-space or APB (column 0, code 8). In the terminal the effect of this is to move the cursor to its initial position so that characters of different attributes can be displayed without space between them. The technique has the advantage that it can use the existing U.K. viewdata transmission codes shown in FIG. 4 of the drawings without any modification whatsoever.

The modified display terminals of FIG. 3 for the system will interpret the ESC, (Fe), APB code sequence as the specification of an attribute change occurring at the active position. Since the active position is returned to its initial position, any number of these code sequences may be transmitted to change attributes at a character location ensuring complete flexibility of frame description. After this location, attributes remain set until overridden or until the end of the line as in the current U.K. viewdata system.

Chipsets to manufacture terminals operating in this manner are already available (e.g. the Philips AROM chip, with parallel attribute display system). With existing terminals, i.e. ones not having the parallel attribute facility, the APB would overwrite these attributes, i.e. ignore them, ensuring upwards compatibility. Thus the transmission technique is compatible with both types of terminals.

It might be thought that because an extra character (APB) is necessary in each control sequence that the transmission efficiency of this method is inferior to the conventional character orientated attribute systems. However, it has always been the U.K. viewpoint that attribute changes normally occur in interword spacings. In this new system the interword attribute changes would be transmitted as two character ESC (Fe) sequences, without APB, exactly as in the current viewdata system. As in the current system these two character sequences would be represented on the screen as a space character. In all such cases the enhanced system would have a clear advantage over the conventional character orientated attribute systems which must transmit an additional character (2/0=SPACE).

In general terms the present system is moe efficient for displaying textural areas of a frame, whilst a conventional character orientated attribute system is more efficient with mosaic picture creations. The present system also has the advantage of efficient storage previously referred to.

Two changes would be desirable to the central computers of the viewdata system.

(a) The 1K disc segments should be linked. There is no absolute limit to the number of characters that may be stored and transmitted to a terminal. Therefore, in order to provide sufficient computer storage for describing a frame, it would be necessary to link 1K disc segments.

(b) It is desirable for the conventional editor program to be modified to incorporate the following procedure:

(1) to note (in order) the application of 3 character ESC, Fe, APB control sequences.

(2) to replace (in the same order) following space characters (2/0) with the same 2 character ESC, Fe control sequences.

(3) to replace the code sequences ESC, Fe, APB, 2/0 with the sequence ESC, Fe.

Figure 5:
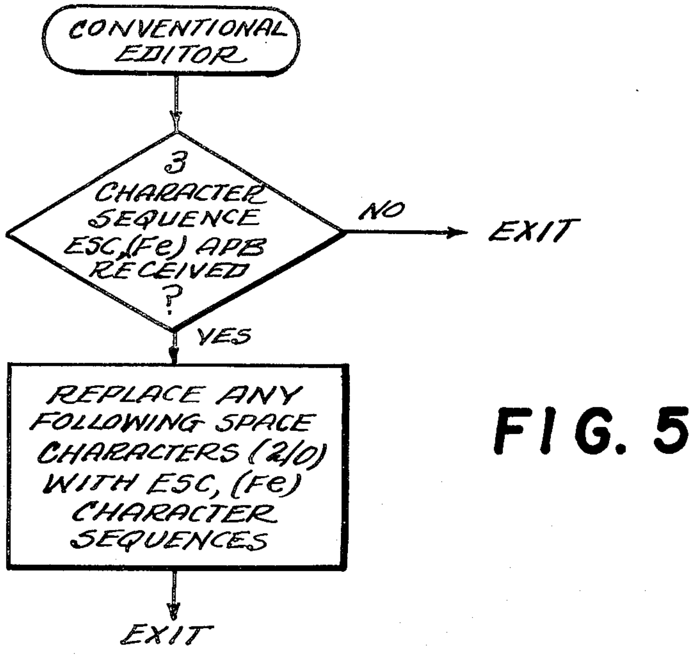
FIG. 5 is a flow diagram of one exemplary modification to the editor program of the central data processor useful in practicing this invention.

Items (1)-(3) would ensure the best display possible on old style terminals and this modification to the existing editor program is illustrated in the flow chart of FIG. 5.

Figure 6:
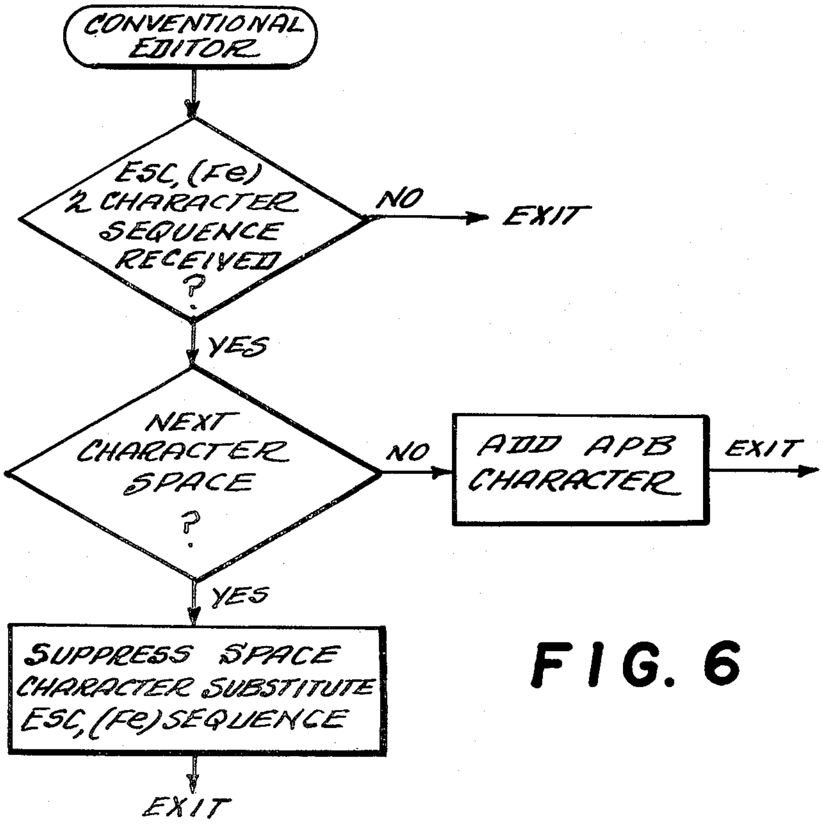
FIG. 6 is a flow diagram of another exemplary modification to the editor program of the central data processor useful in practicing this invention.

It might also be desirable to introduce a new mode of operation in the editor. In this mode, the user would only be required to press the display control key required, and the editor would insert APB automatically, unless the control was followed by a space (2/0) character. In the latter case the editor would suppress the space character instead of adding an APB character. From a user's point of view this new editing mode would provide a much more logical keyboard operation than the alternative existing system for inputting character oriented attribute defined attributes and this modification to the existing editor program is illustrated in the flow chart of FIG. 6.

As described above the transmission is such that the APB code follows the control code. Any number of character attributes may be sent on a character, each attribute control code being followed by an APB code.

In certain circumstances this can lead to problems with the latest design of Viewdata terminals. The problem arises when it is required to change from an alphanumeric character to a graphics display without a space between the two. On a normal Viewdata terminal a space is required whilst in the system described above the change would be achieved by transmitting the alpha to graphics display control code, followed by the cursor backspace code, followed by the code for the first graphics character. This sequence of codes can be correctly interpreted by existing Viewdata terminals but in terminals of the latest design the control code is overwritten by the code for the first graphics character and the display does not change to the graphics mode.

Thus there is a requirement for the coding technique to accommodate a change between alphanumeric characters and graphics characters without a space between characters, the tecnhique being compatible with existing terminals.

We have found that the requirement can be met arranging the system so that an attribute change is represented by the cursor backspace code followed by the display control code. In such a system this sequence of codes would be transmitted after the code for a particular character which could be the final character of the old attribute or the first character of the new attribute.

For example to change from alphanumerics to graphics the sequences could be: first graphics character code followed by the cursor backspace code, followed by the alpha to graphics control code. In this case the first graphics character is overwritten by the control code in an existing Viewdata terminal. This means that the definition of the graphics display may not be so high but the remainder of the display is still correct. The graphics display is still as good as can be achieved in a conventional Viewdata terminal.

In the case of terminals of the latest design the way in which they respond to a graphics control code (5/0 to 5/7 of FIGS. 4A-4D) is as follows. On receipt of one of the graphics control codes (5/0 to 5/7 of FIGS. 4A-4D) all subsequent characters and any character previously received at the same cursor location are displayed in graphics of the appropriate colour until receipt of a new display control code or until the end of the line is reached.

To change from graphics to alphanumerics a similar sequence can be involved. In this case the most probable code sequence is: code for final graphics character, followed by cursor backspace code, followed by graphics to alpha control code. In this case the final graphics character is overwritten by the display control code in an existing terminal but this is considered preferable to overwriting the first alphanumeric character.

For terminals of the latest design the arrangement is such that they respond to the alphanumeric control codes (4/0 to 4/7 FIGS. 4A-4D) as follows. On receipt of one of the codes (4/0 to 4/7) all subsequent characters are displayed in alphnumerics of the appropriate colour until receipt of a new display control code or until the end of the line is reached.

Thus it will be seen that character attribute changes without the requirement for a space between characters can be achieved by use of the code sequence: cursor backspace code followed by display control code.

The particular sequence which is employed, control code followed by APB or vice versa, can be decided by the information provider when the information is loaded into the computer. Which sequence is selected depends upon whether it is more important to ensure that a particular character is correct or whether the attribute is correct. The present technique gives to the provider the facility to make the selection.

We claim:

1. A videotex type data transmission system comprising:

central information processing and storage means for storing and retrieving coded digital information signals representing display characters and character attributes thereof;

a plurality of remotely situated data displaying terminals, some having split memory character oriented attribute display systems and others having string oriented attribute display systems; and digital data communication means connecting said central information processing and storage means situated at a central site to said plurality of remotely situated data displaying terminals for selective serial transmission of said coded information signals to said remote terminals;

said central data processing means effecting transmission of a cursor backspace code substantially adjacent a transmitted display control code representing a display character attribute unless the just previous display character is to be followed by a display space thereby permitting successful compatible videotex transmission of the same said coded information signals to the remote terminals having split memory character oriented attribute display systems as well as to the remote terminals having a string oriented attribute display system without requiring a displayed space between changes in displayed character attributes on any remote terminal.

2. A videotex type data transmission system as in claim 1 wherein when said central data processing means associates a plurality of control codes with a particular character display location, a cursor backspace code is transmitted in association with each such control code.

3. A videotex type data transmission system as in claim 1 wherein said cursor backspace code follows said control code.

4. A videotex type data transmission system as in claim 1 wherein said cursor backspace code precedes said control code.

5. A videotex type data transmission system as in claim 1 wherein said digital data communication means comprises a network of telephone lines.

6. A method of serially transmitting in a videotex type data transmission system, coded information representing characters and character attributes between a central information store and a plurality of remotely situated data displaying terminals, some having split memory character oriented attribute display systems and others having string oriented attribute display systems, said method comprising the steps of:

transmitting a cursor backspace code substantially adjacent a transmitted display control code representing a display character attribute unless the just previous display character is to be followed by a display space thereby permitting successful compatible videotex transmission of the same coded information signals to the remote terminals having split memory character oriented attribute display systems as well as to the remote terminals having a string oriented attribute display system without requiring a displayed space between changes in displayed character attributes on any remote terminal.

7. A method as in claim 6 wherein said cursor backspace code follows the control code.

8. A method as in claim 6 wherein said cursor backspace code precedes the control code.

9. A method as in claim 6 wherein when a plurality of control codes are associated with a particular display character location, a cursor backspace code is transmitted in association with each such control code.

* * * * *